United States Patent [19]

Yoshida

[11] Patent Number: 5,729,526
[45] Date of Patent: Mar. 17, 1998

[54] ASYNCHRONOUS TRANSFER MODE TYPE MULTIMEDIA RADIOCOMMUNICATION SYSTEM

[75] Inventor: Makoto Yoshida, Kawasaki, Japan

[73] Assignee: Fujitsu Limited, Kanagawa, Japan

[21] Appl. No.: 663,895

[22] Filed: Jun. 14, 1996

[30] Foreign Application Priority Data

Oct. 31, 1995 [JP] Japan ................. 7-282982

[51] Int. Cl.$^6$ ................................................. H04J 3/02
[52] U.S. Cl. .................. 370/206; 370/342; 370/347; 370/395; 370/538; 375/265
[58] Field of Search ......................... 370/395, 419, 370/420, 437, 441, 442, 462, 463, 464, 465, 468, 470, 471, 472, 476, 478, 479, 480, 481, 482, 486, 319, 320, 321, 335, 336, 337, 342, 343, 345, 347, 203, 204, 206, 207, 208, 522, 538; 375/261, 262, 265, 341, 200, 205, 206, 208, 209, 210, 279, 280, 281, 329, 330, 331, 342, 298; 371/37.1, 37.8, 43, 44, 45, 46, 48, 379

[56] References Cited

U.S. PATENT DOCUMENTS

| | | |
|---|---|---|
| 4,941,154 | 7/1990 | Wei .......................... 375/262 |
| 5,396,518 | 3/1995 | How .......................... 375/265 |
| 5,418,798 | 5/1995 | Wei .......................... 375/265 |
| 5,537,430 | 7/1996 | Park et al. ................... 375/265 |
| 5,565,926 | 10/1996 | Bryan et al. ................. 375/265 |
| 5,583,889 | 12/1996 | Citta et al. .................. 375/341 |

*Primary Examiner*—Wellington Chin
*Assistant Examiner*—Huy D. Vu
*Attorney, Agent, or Firm*—Helfgott & Karas, P.C.

[57] ABSTRACT

An asynchronous transfer mode type multimedia radiocommunication system including a transmitter and a receiver connected to the transmitter via an asynchronous transfer mode network and wherein accesses to two channel data which communicate by radio and have different levels of communication quality, are performed by the asynchronous transfer mode network. A separator of a transmitter separates input data into L-bit main channel data and one-bit sub channel data. A convolutional coder convolutionally codes the data. Further, a mapper maps the resultant binary information onto crossed I and Q channel axes according to the data by switching for each L bit of the main channel data, thereby enabling transmission of additive information corresponding to data of 1/L the transfer rate. Thereafter, a viterbi decoder of a receiver decodes the information. Further, a sub channel having arbitrary communication quality can be provided by arbitrarily selecting the value $(L_{min} \leq L)$ of an L bit.

7 Claims, 13 Drawing Sheets

ASYNCHRONOUS TRANSFER MODE TYPE MULTIMEDIA RADIOCOMMUNICATION SYSTEM

BACKGROUND OF THE INVENTION

1. Field of the Invention

The present invention relates to an asynchronous transfer mode (ATM) type multimedia radiocommunication system.

This type of system is of one in which an ATM communication system for transmitting a cell corresponding to a fixed packet composed of 53 bytes in total obtained by adding 5 bytes indicative of a header portion and 48 bytes indicative of a data portion, to an optical fiber network is materialized by a radiocommunication system for satellite communications and mobile communications or the like. Further, the present system is intended to substantially permit an easy enlargement of a communication area for the optical fiber network by making a seamless environment relative to a wire access network and obtaining access to an actually hard-to-be executed optical fiber network through radio communications. The implementation of a radio access network makes it possible to provide mobility and new services unfeasible for wire can be provided.

2. Description of the Related Art

An ATM is of a transmission mode or system for implementing a B-ISDN (Broadband aspects of Integrated Services Digital Network), which is based on the premise that transmission is made through an optical fiber in particular. Thus, the present ATM is based on the premise that BER (Bit Error Rate: communication quality) required by the ATM is $10^{-11}$ or less. Since the performance of the system depends on the wasting of a cell because the communication quality is satisfactory, it is generally known that a request BER made to a header is generally defined as $10^{-11}$ or less ($10^{-7}$ or less at the worst case) for ATM video coding and a BER about data is defined as about $10^{-6}$ or less in the case of images or the like.

In radiocommunications on the other hand, voice transmission in which the communication quality is poor and the request BER is $10^{-2}$ or more, and low-speed data of several Kbps went mainstream. It is also said that mobile communications are under the influence of multipath-fading and a floor in which a curve of BER levels off at a given level, is produced in BER. The setting of the entire channel to a high quality of BER=$10^{-11}$ or less in a communication channel whose capacity is small, is ineffectual from the viewpoint of frequency and power. Therefore, two different channels must be prepared to realize the ATM by radio as in the case of BER about the header=$10^{-11}$ or less and BER about the data=$10^{-6}$ or less.

The reason why the header is set to the high quality, is that since control information such as destination information or the like has been stored in the header, the data cannot be received (cell is abandoned) when the header is deteriorated and the sequence of the header is altered. Further, an error-correcting technique is indispensable for transmitting data at high speed in the aforementioned poor channel. This technique has been put into practical use in part of the satellite communications and the mobile communications. It is also known as a fading compensating technique that adaptive antenna control using equalize and directional antennas and diversity or the like will achieve a floorless effect.

Since wide-band transmission at 156 Mbps or the like, for example, is carried out using the cell in the aforementioned ATM network, the transmission must be placed in a waiting state until a predetermined amount of information is packed into the cell. When low-speed data such as voice for the radiocommunications are processed upon access of the ATM network to the radiocommunications, a delay in transmission produced due to a delay in packing of information into the cell turns into a problem. Further, a delay in transmission turns into a problem since error-correction and re-transmission (ARQ) are effected on high-speed data (Video) to ensure the quality of a circuit or channel.

Further, in order to achieve the ATM by radio with satisfactory efficiency as described above, a system is considered wherein two different channels, i.e., two different communication systems or modes are prepared as in the case of BER of the header=$10^{-11}$ or less and BER of the data= $10^{-6}$ or less. When, however, the two different channels are prepared, the efficiency is poor since the two channels are physically prepared. A technique for increasing the transmission capacity as compared with the conventional one and providing two different circuits or channels under one communication system still remains undeveloped at present. Further, a method of preventing an increase in transmission delay by providing different channels remains unproposed even now.

SUMMARY OF THE INVENTION

It is therefore an object of the present invention to provide an asynchronous transfer mode type multimedia radiocommunication system wherein when an ATM network is allowed to access radiocommunications, the transmission capacity can be increased without both an enlargement of a band and an increase in power and a delay in transmission, and two channels having different levels of communication quality can be obtained.

In accordance with an aspect of the present invention, there is provided an asynchronous transfer mode type multimedia radiocommunication system including a transmitter and a receiver connected to the transmitter via an asynchronous transfer mode network and wherein accesses to two channel data which communicate by radio and have different levels of communication quality, are performed by the asynchronous transfer mode network, said transmitter comprising: a separator for separating input data into L-bit main channel data and one-bit sub channel data; a convolutional coder for convolutionally coding the main channel data; and a mapper for mapping the convolutionally-coded binary information onto crossed I and Q channel axes by switching every L bits of the main channel data in response to the sub channel data, thereby enabling transmission of an addition information corresponding to the sub channel data of 1/L of a transmission rate.

Preferably, the receiver includes a viterbi decoder for performing switching between the I and Q channel axes for each L symbol of a receive signal and merging mutual trellises on the I and Q channel axes into one, thereby decoding sub channel transmission information corresponding to the addition information simultaneously with coded information obtained by viterbi decoding associated with the convolutional coding.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
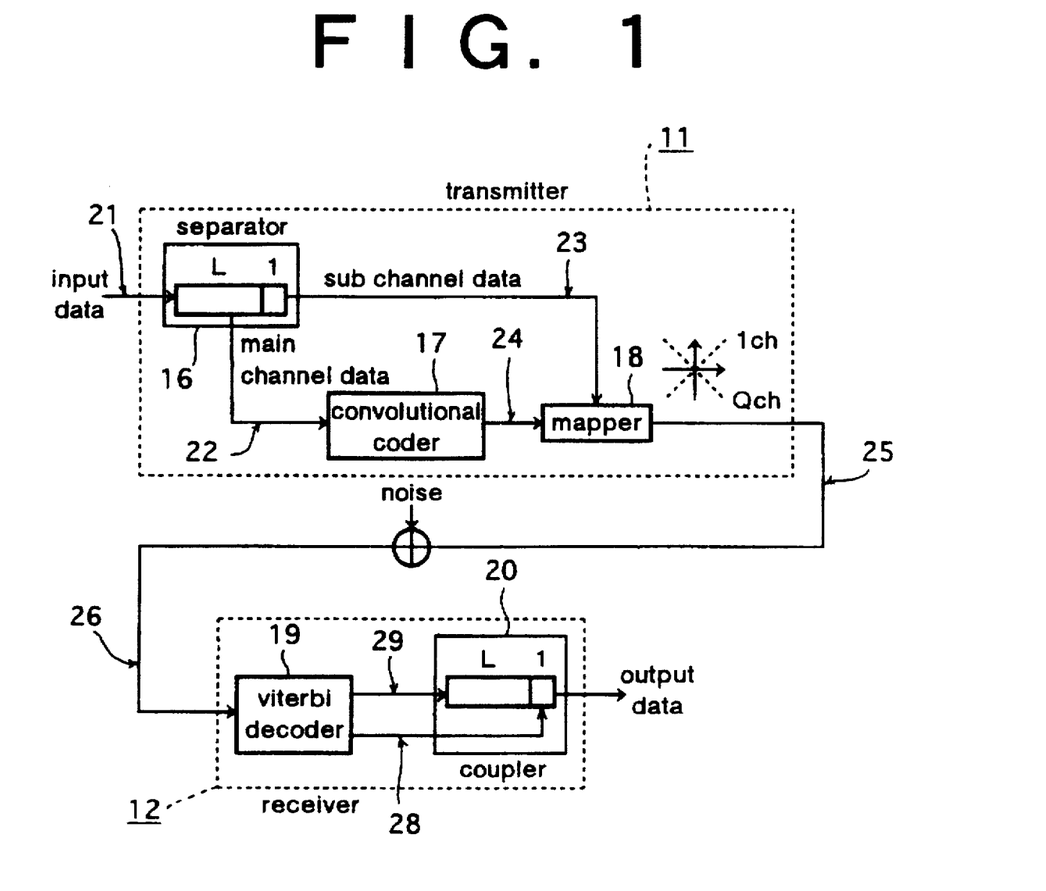
FIG. 1 is a diagram for describing the principle of the present invention.

FIG. 1 shows the principle of the present invention. An asynchronous transfer mode type multimedia radiocommunication system shown in FIG. 1 is of the type wherein accesses to two channel data having different levels of communication quality are made by an asynchronous transfer mode network. The present invention is characterized by comprising a transmitter 11 composed of a separator 16 for separating input data 21 into L-bit main channel data 22 and one-bit sub channel data 23, a convolutional coder 17 for convolutionally coding the main channel data 22 and a mapper 18 for mapping the convolutionally-coded binary information 24 onto crossed I and Q channel axes in response to the sub channel data 23 by switching for each L bits of the main channel data 22, thereby enabling transmission of additive information corresponding to the sub channel data 23 of 1/L of the transmission rate, and a receiver 12 composed of a viterbi decoder 19 which is used for I and Q channels for performing viterbi decoding associated with the convolutional coding and which performs switching between the I and Q channels for each L decoding symbol of a signal received therein so as to merge mutual trellises of the I and Q channels into one, thereby decoding sub channel transmission information indicative of the additive information simultaneously with coded information obtained by the viterbi decoding.

Embodiments of the present invention will hereinafter be described with reference to the accompanying drawings.

Figure 2:
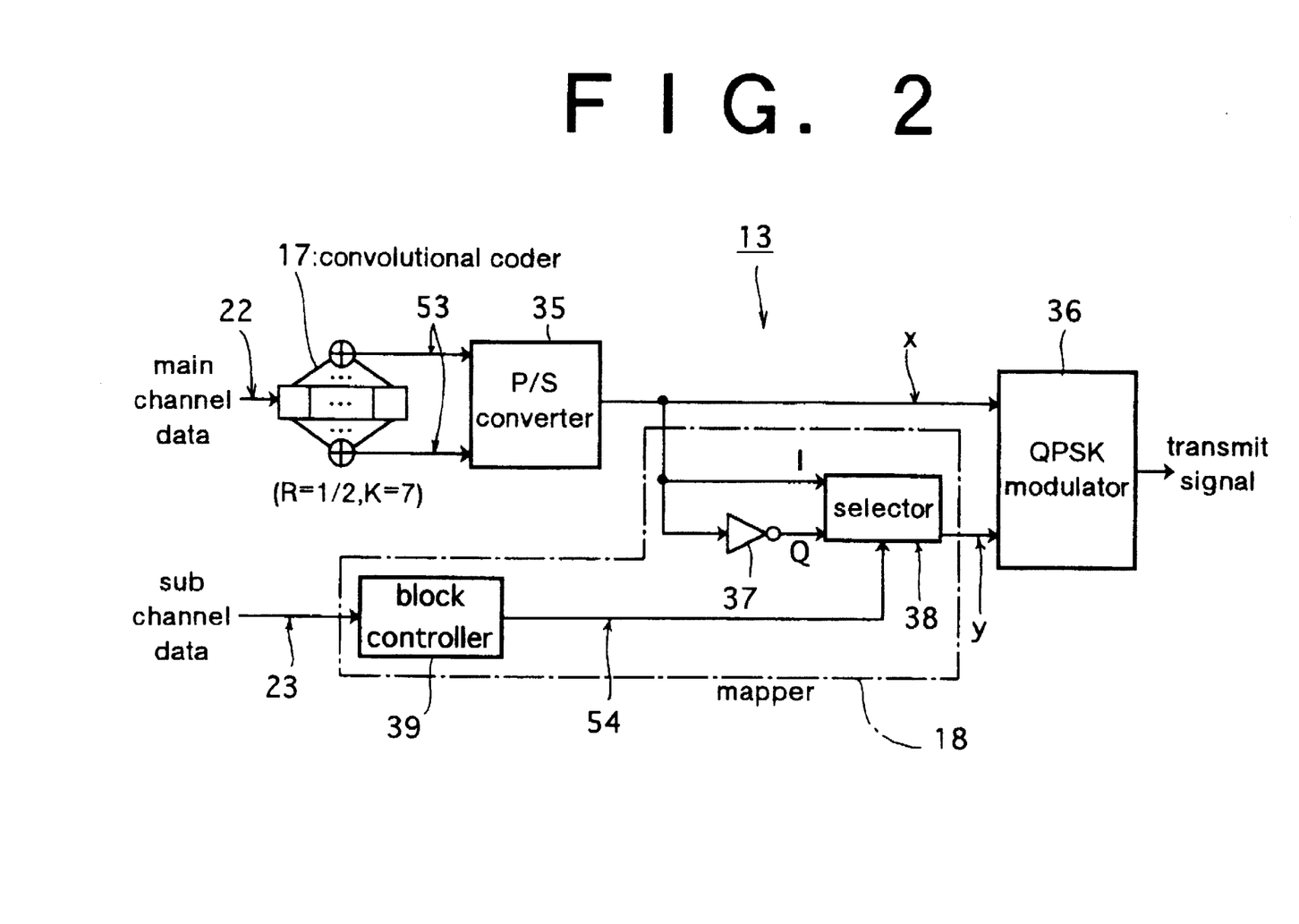
FIG. 2 is a block configurational diagram showing a transmitter employed in an asynchronous transfer mode type multimedia radiocommunication system according to a first embodiment of the present invention.
Figure 3:
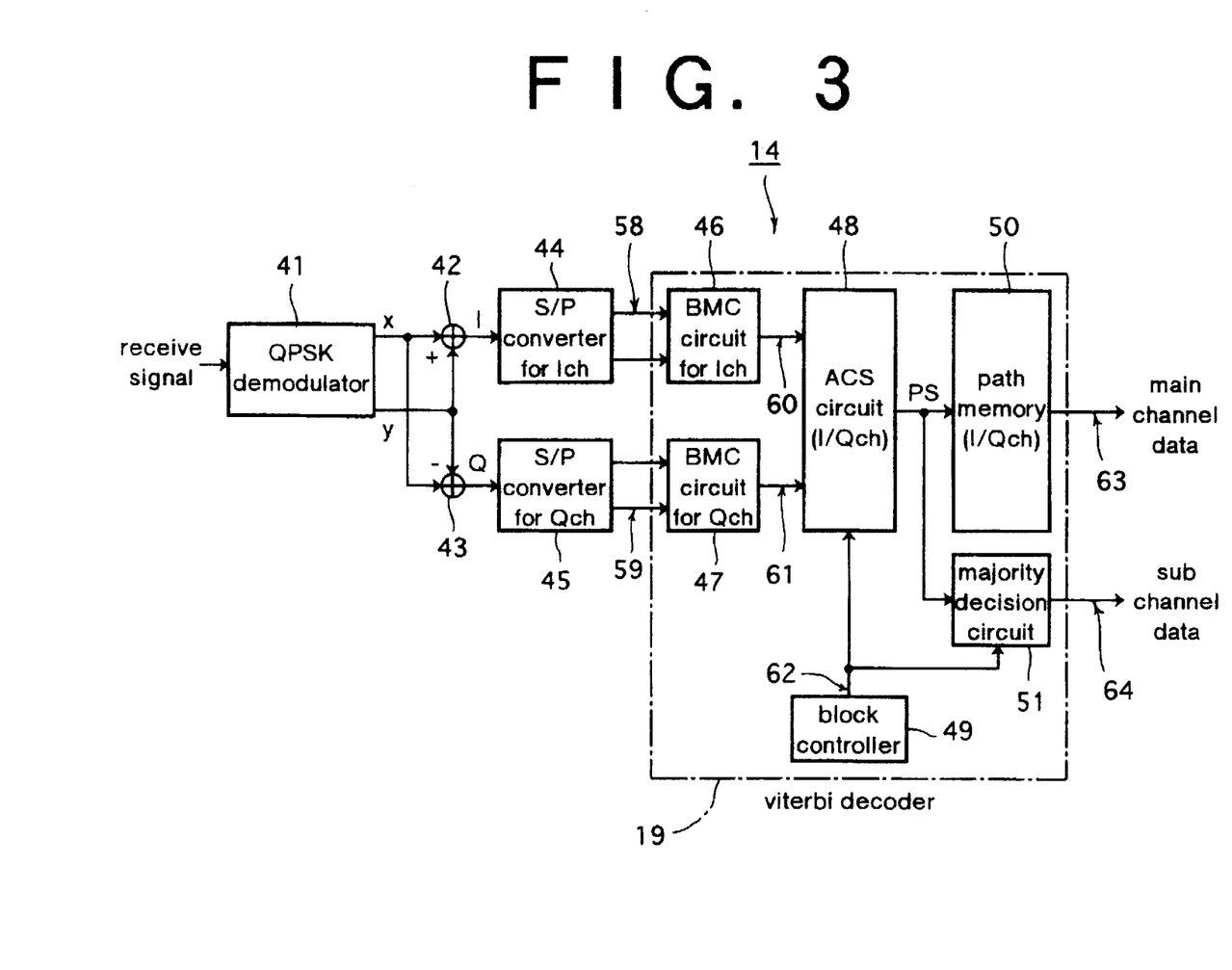
FIG. 3 is a block configurational diagram showing a receiver employed in the first embodiment of the present invention.

FIG. 2 is a block configurational diagram showing a transmitter suitable for use in an asynchronous transfer mode type multimedia radiocommunication system according to a first embodiment of the present invention. FIG. 3 is a block configurational diagram illustrating a receiver. The principles of the transmitter 11 and the receiver 12 shown in FIG. 1 are respectively applied to a transmitter 13 and a receiver 14 shown in FIGS. 2 and 3.

The transmitter 11 and the receiver 12 shown in FIG. 1 will be first described. The transmitter 11 and the receiver 12 are based on the premise that BPSK (Binary Phase Shift Keying) modulation and an error-correction (convolutional coding—viterbi decoding) are performed. However, they may be based on a multivalue modulation system (MPSK and QAM). Alternatively, any coding and decoding may be applied to them if the maximum likelihood decoding is allowed. The transmitter 11 comprises a separator 16, a convolutional coder 17 and a mapper 18. The receiver 12 comprises a viterbi decoder 19 and a coupler 20.

Input data 21 is divided into L-bit main channel (conventional BPSK channel) data 22 and one-bit sub channel (orthogonal channel of main channel) data 23. For example, the former is data stored in an ATM cell and the latter is a header. The main channel data 22 is convolutionally coded at a coding rate k/n by the convolutional coder 17. Thereafter, the coded binary data 24 is mapped as BPSK data by the mapper 18 according to the sub channel data 23. Namely, a transmission rate is mapped to one points on Ich (data=0) and Qch (data=1) axes based on the 1/L sub channel data 23. In other words, these sub channel data 23 are BPSK-mapped onto a QPSK (Quadrature Phase Shift Keying) modulator so as to be superposed on a carrier phase, followed by its transmission. The radio-transmitted signal is designated at numeral 25.

Thus, the utilization factor of the frequency can be increased from the conventional BPSK modulation and error-correcting mode (k/n)bps/Hz to a k(1+1/L)/n bps/Hz. This means that if the same occupied bandwidth is used, then the transmission rate is increased to (L+1)/L. Consequently, the assignment of this increase to a radio-dedicated control signal (such as a preamble or the like) makes it also possible to inhibit a redundant portion from occurring in a radio zone. Since a BPSK decision is made although the present system makes use of the QPSK modulator and demodulator, the BER is not degraded.

Figure 4:
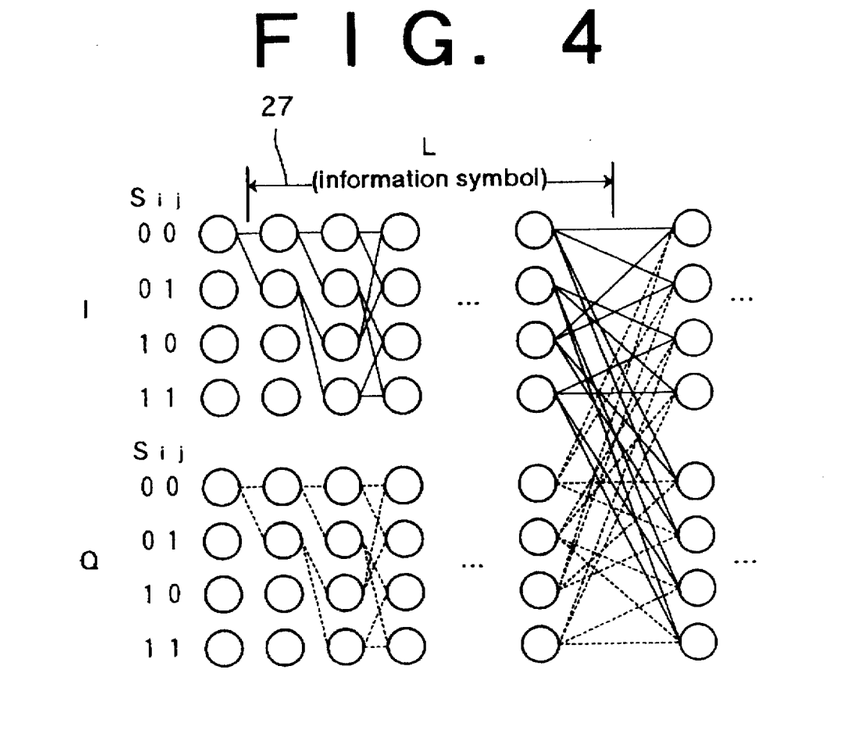
FIG. 4 is a trellis diagram.
Figure 5:
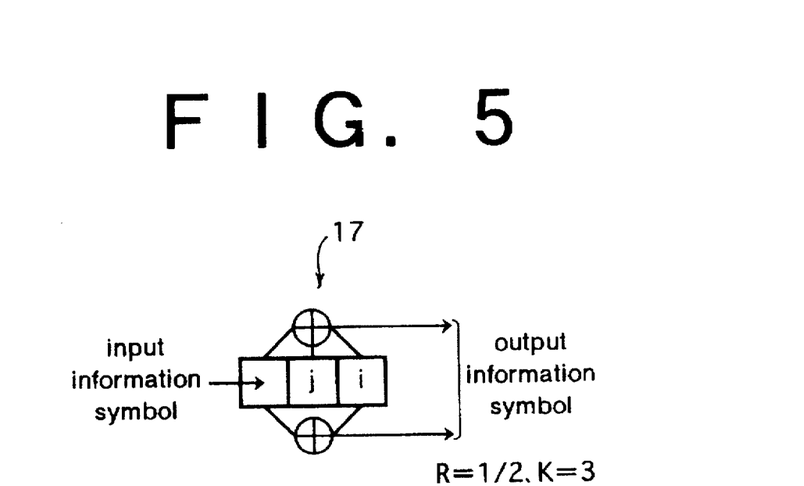
FIG. 5 is a diagram showing a convolutional coder.

In the receiver 12 on the other hand, the transmitted signal 26, i.e., the transmitted axis (Ich or Qch) and the received sequence or series are simultaneously decoded by the viterbi decoder 19. This is achieved by effecting viterbi decoding on trellises in which ○ (circles) shown in a trellis diagram (state transition diagram) of FIG. 4 are connected to one another with solid lines or broken lines. This trellis diagram shows the case where a polynomial for generating a convolutional code from the convolutional coder 17 is given by a coding rate R=½ and a constraint length K=3 (at 7, 5: octal digit). A viterbi decoder for Ich and Qch is required due to the sub channel. Namely, states $S_{ij}^{(I)}$ and $S_{ij}^{(Q)}$ (i, j=0, 1) will now be considered as shown in FIG. 4. Paths are merged into ones every L information symbols (2L transmission symbols in this case, i.e. 2 symbols/branch decoding) indicated by arrow 27 in FIG. 4.

Figure 6:
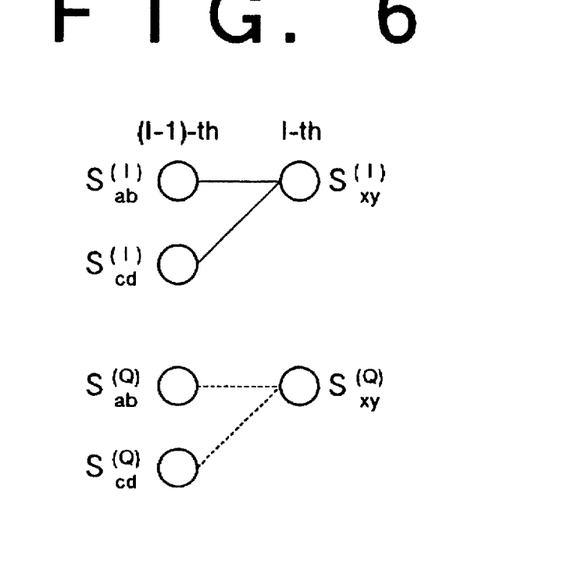
FIG. 6 is a diagram for describing the trellis merging of two paths into one.
Figure 7:
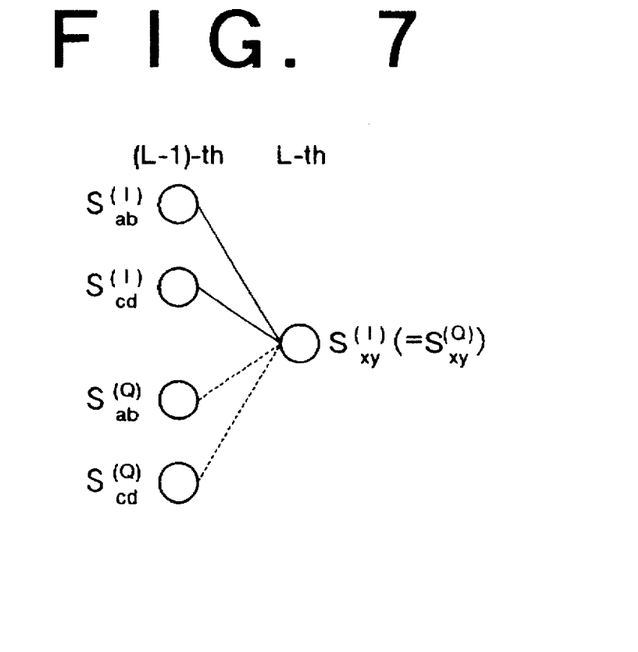
FIG. 7 is a view for describing the trellis merging of four paths into one.

When 1th ($1 \leq 1 \leq L-1$) information symbols are decoded as shown in FIG. 6, viterbi decoding similar to the conventional one is effected. That is, the respective two merged paths (the distances between $S_{ab}^{(I)}$ and $S_{xy}^{(I)}$ and between $S_{cd}^{(I)}$ and $S_{xy}^{(I)}$ or between $S_{ab}^{(Q)}$ and $S_{xy}^{(Q)}$ and between $S_{cd}^{(Q)}$ and $S_{xy}^{(Q)}$) of the respective states $S_{ij}^{(I)}$ or $S_{ij}^{(Q)}$ are separately calculated in distance to determine the remaining or survival path. Further, one best under all the states is selected as the maximum likelihood path. At this time, the state in which the maximum likelihood path has been selected, is stored. Further, when Lth information symbols are decoded as shown in FIG. 7, the survival path is determined from four paths [between $S_{ab}^{(I)}-S_{xy}^{(I)}(=S_{xy}^{(Q)})$, between $S_{cd}^{(I)}-S_{xy}^{(I)}(=S_{xy}^{(Q)})$, between $S_{ab}^{(Q)}-S_{xy}^{(I)}(=S_{xy}^{(Q)})$ and between $S_{cd}^{(Q)}-S_{xy}^{(I)}(=S_{xy}^{(Q)})$] merged from all the states $S_{ij}^{(I)}$ and $S_{ij}^{(Q)}$. At this time, the same results are stored in the same states of the Ich and Qch.

Thus, special operations such as path-forcible breakoff, etc. are not necessary because a path metric value is initialized. If sub channel data (designated at numeral 28 in FIG. 1) is decoded under the adoption of the state of selection of the maximum likelihood path by the decision of the majority, then no delay in transmission is developed between the sub channel data and main channel data (designated at numeral 29 in FIG. 1). As a result, both data 28 and 29 can be combined into one by the coupler 20.

The feature of a viterbi algorithm is that a value obtained by adding up or integrating Euclidean distances on a signal space is used as reliability (path metric value). Therefore, the minimum block length $L_{min}$ required to avoid a deterioration in characteristic is determined based on the quality of a circuit (C/N) necessary for the system. Namely, in the case of overall C/N conditions, the block length for determining the transmission rate of the sub channel is represented as follows:

$$L_{min} = \begin{cases} 2d_{free}/n & \text{(for } 2d_{free} = n \times k, \ k\text{: integer)} \\ \lfloor 2d_{free}/n \rfloor + 1 & \text{(for } 2d_{free} \neq n \times k) \end{cases}$$

where $d_{free}$ indicates the minimum free distance, n indicates the number of transmission symbols for one decoding symbol, and $\lfloor \ \rfloor$ indicates Gauss's symbol. It is needless to say that if a block length greater than $L_{min}$ is used, then a channel of high quality according to its length can be provided.

If, for example, a convolutional code ($d_{free}=10$) having the coding rate $R=\frac{1}{2}$ and the constraint length $K=7$ is used, then $L_{min}10$. If $L=20$, then a channel having 1.5 dB of improvement in C/N and 2.0 dB or more of improvement in main channel can be provided for an $R=\frac{1}{3}, k=5(d_{free}=12)$ convolutional code, $n=3$ and $L_{min}=8$.

Figure 8:
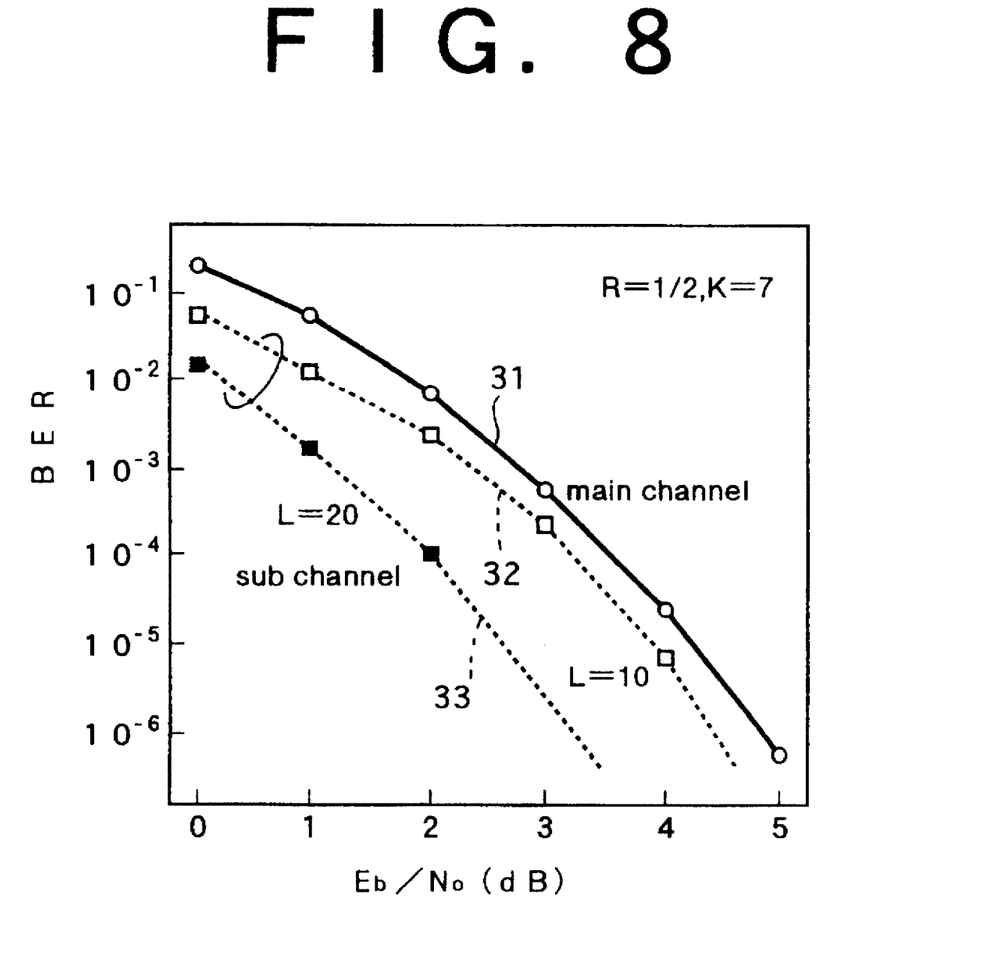
FIG. 8 is a BER characteristic diagram.

FIG. 8 shows the result of simulation of a convolutional code having the coding rate $R=\frac{1}{2}$ and the constraint length $K=7$ vs. BER characteristic, in an additive white Gaussian noise(AWGN) channel, obtained upon the viterbi decoding by the transmitter 11 and the receiver 12 shown in FIG. 1 (where data extends to $BER=10^{-6}$). Reference numeral 31 indicates a BER characteristic curve of main channel data, reference numeral 32 indicates a BER characteristic curve of sub channel data obtained when $L=10$ ($=L_{min}$), and reference numeral 33 indicates a BER characteristic curve of the sub channel data obtained when $L=20$ ($=2L_{min}$).

The transmitter 13 and the receiver 14 shown in FIGS. 2 and 3 will next be described. In FIGS. 2 and 3, the same elements of structures as those in the transmitter 11 and the receiver 12 shown in FIG. 1 are identified by like reference numerals. Further, the separator 16 shown in FIG. 1 is omitted from the transmitter 13 shown in FIG. 2 and the coupler 20 is omitted from the receiver 14 shown in FIG. 3. Namely, the transmitter 13 comprises a P/S converter (Parallel/Serial converter) 35 and a QPSK modulator 36 in addition to a convolutional coder 17 and a mapper 18. The mapper 18 is composed of an inverter 37, a selector 38 and a block controller 39.

The receiver 14 comprises a QPSK demodulator 41, an adder 42, a subtracter 43, an S/P converter (Serial/Parallel converter) 44 for an Ich and an S/P converter 45 for a Qch in addition to a viterbi decoder 19. The viterbi decoder 19 consists of a BMC circuit 47 for the Qch, an ACS (Adder-Comparator-Selector) circuit 48, a block controller 49, a path memory 50 and a majority decision circuit 51. Further, the transmitter 13 and the receiver 14 are based on the premise that the BPSK modulation and the error-correction (convolutional coding—viterbi decoding) are performed as described above. However, they are not necessarily limited to or by their parameters (such as a coding rate, a constraint length, a transmission rate, etc.). Data transmitted through two different channels will not be limited to or by an ATM packet (cell).

A polynomial for generating a convolutional code from the convolutional coder 17 will be given by a coding rate $R=\frac{1}{2}$ and a constraint length $K=7$ (at 171, 133: octal digit). Main channel data 53 convolutionally-coded by the convolutional coder 17 is BPSK-signalized by the P/S converter 35. The BPSK-signalized data x is supplied to one input terminals of the QPSK modulator 36 and the selector 38 as it is and supplied to the other input terminal of the selector 38 through the inverter 37. If the main channel data x is now regarded as Ich, then its reverse data is given by Qch.

Figure 9A:
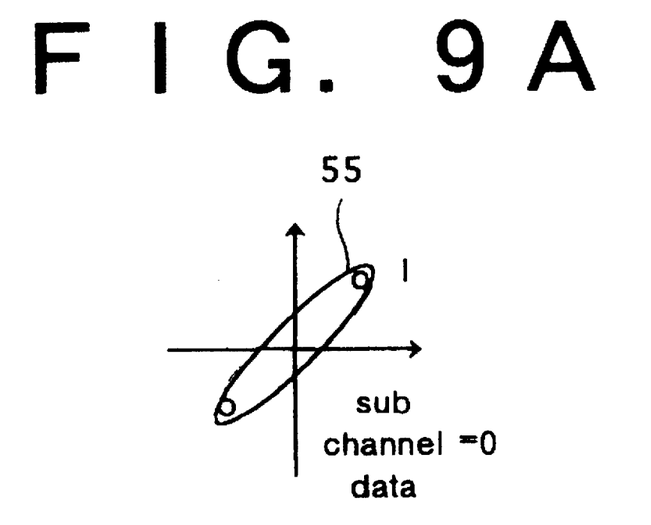
FIG. 9A and FIG. 9B are diagrams showing signals mapped on an Ich axis and a Qch axis, respectively.
Figure 9B:
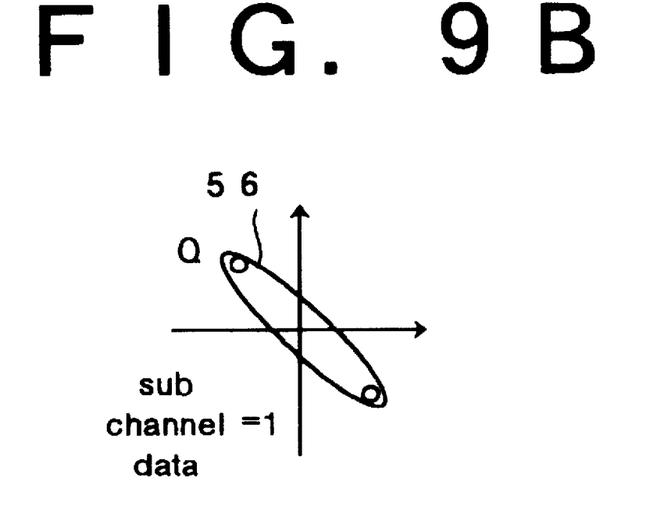

On the other hand, the block controller 39 generates a selection signal 54 for allowing the selector 38 to select the data supplied to both input terminals of the selector 38, for each L information symbol (2L transmission symbol) according to "0" or "1" of sub channel data 23. The selector 38 selects either one of the input data in response to "0" or "1" of the selection signal 54 and outputs it to the QPSK modulator 36 as data y. Thus, the QPSK modulator 36 maps the main channel data x onto the Ich and Qch axes as designated at numerals 55 and 56 in FIGS. 9A and 9B. Namely, when the sub channel data 23 is of 0, y=x so that the signal is mapped onto the Ich axis, followed by transmission to a radio channel. On the other hand, when the sub channel data 23 is of "1", y=−x so that the signal is mapped onto the Qch axis, followed by transmission to a radio channel.

In the receiver 14 shown in FIG. 3, a receive signal is first demodulated by the QPSK demodulator 41 so as to obtain data x and y similar to those input to the QPSK modulator 36 of the transmitter 13. The data x and y are subjected to addition and subtraction by the adder 42 and the subtracter 43 so as to be separated into Ich and Qch data. Thereafter, the Ich data is input to the S/P converter 44 for the Ich, whereas the Qch data is input to the S/P converter 45 for the Qch.

After the Ich and Qch data have been converted into parallel data 58 and 59 respectively, the converted data are respectively input to the BMC circuits 46 and 47 where Euclidean distances (branch metric values: BM values) between their signal points and the received signal are calculated and the sums of addition of the BM values are respectively calculated to obtain path metrics 60 and 61, after which they are input to the ACS circuit 48.

The ACS circuit 48 adds the respective path metrics 60 and 61 for each symbol and compares them to select the maximum likelihood path corresponding to the best one from all the remaining or survival paths for Ich and Qch. A signal PS indicative of the selected maximum likelihood path is stored in the path memory 50 and decoded as main channel data 63. An axis (path selection signal PS) at which the maximum likelihood path has been selected, is decoded and obtained under the majority decision of the majority decision circuit 51 based on a selection signal 62 output from the block controller 49 for each L information symbol (2L transmission symbol).

Assuming now that the data BER=$10^{-6}$ in an AWGN channel, conventional ATM headers (5/48=10.5% overhead) for wire systems cannot be transmitted as they are even in consideration of an increase in transmission capacity in the case of ATM. It is however unnecessary to transmit all the headers in order to keep the uniqueness in a radio network. An ATM header (about 2 bytes) compressed for radio transmission of an ATM virtual channel identifier (compressed version) and an ATM control signal (payload type and cell loss priority indication) may be transmitted for L=20, having 2.0 dB gain of subchannel quality.

Further, mobile communications are under the influence of multipath fading and hence a floor is developed in BER. Thus, the compensation for the fading is essential for seamless services in an ATM network. It is also necessary to establish an access system or mode together with its compensating technique. Although various access systems or modes effective for multimedia communications under such fading environments have been proposed, the superiority of either of CDMA (Code Division Multiple Access) and TDMA (Time Division Multiple Access) and the effectiveness of the used multicarrier transmission (OFDM or the like) are not yet confirmed.

Figure 10:
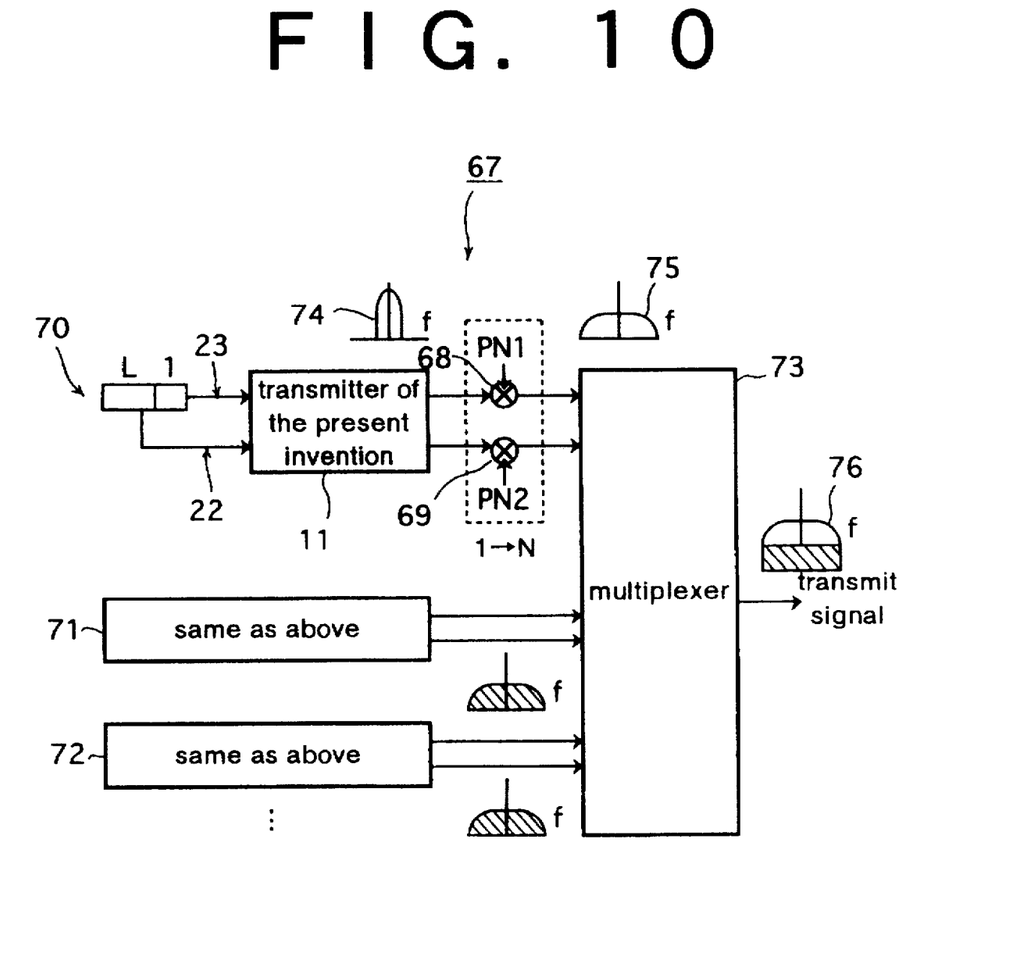
FIG. 10 is a block configurational diagram showing a transmitter according to a CDMA system of a second embodiment of the present invention.
Figure 11:
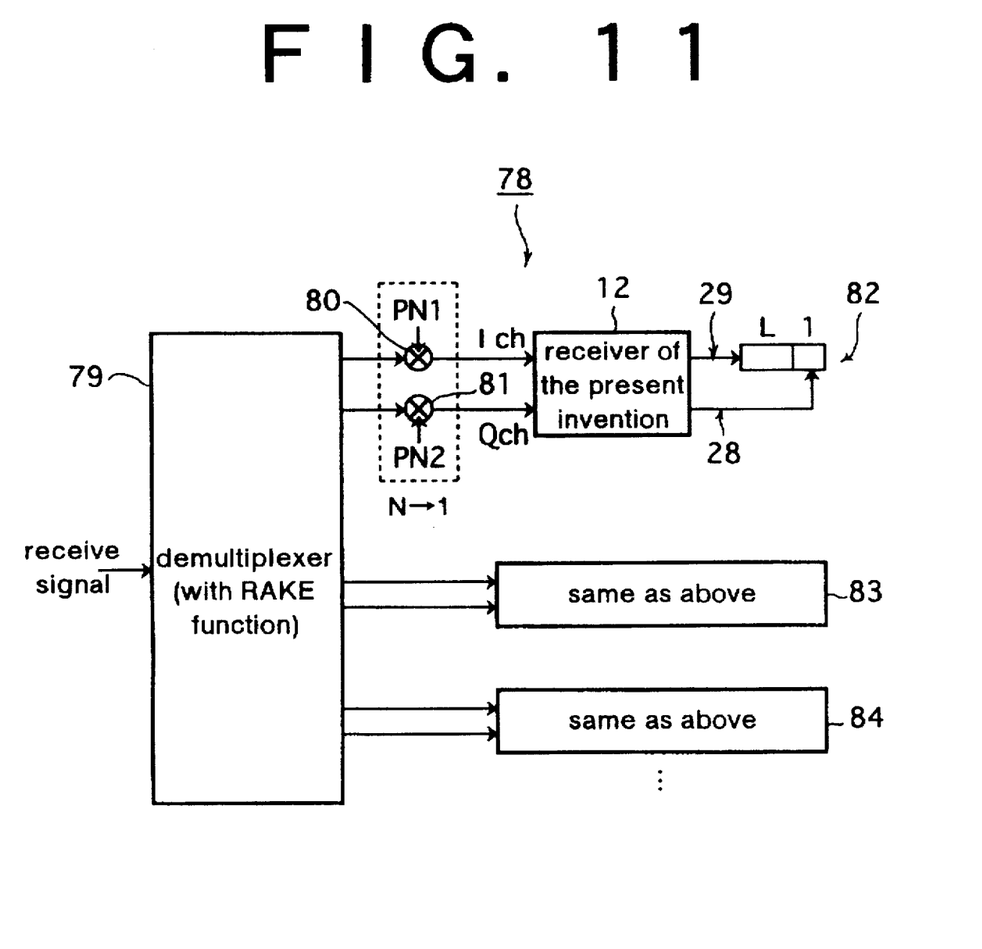
FIG. 11 is a block configurational diagram illustrating a receiver according to the CDMA system of the second embodiment of the present invention.

Since, however, the transmitter and receiver according to the present invention are not directly dependent upon the access mode or system, they can be connected to the respective access modes. A transmitter and a receiver based on or according to a CDMA system or mode using the transmitter and receiver according to the present invention, a transmitter and a receiver according to a TDMA system using the same, and a transmitter and a receiver according to an OFDM-FDMA system using the same will hereinafter be described with reference to FIGS. 10 through 15. In FIGS. 10 through 15, however, elements associated with the respective elements shown in FIG. 1 are identified by like reference numerals and their description will therefore be omitted. FIG. 10 is a block configurational diagram showing a transmitter according to a CDMA system or mode of a second embodiment. FIG. 11 is a block configurational diagram showing a receiver according to the CDMA system.

The transmitter 67 shown in FIG. 10 is of a CDMA access system in which each of the transmitters 11 according to the present invention is defined as a primary modulation scheme. The CDMA access system adopts a configuration wherein a circuit 70, which makes use of the transmitter 11 (in which the separator 16 is externally provided) shown in FIG. 1 and multiplies code series PN1 and PN2 respectively orthogonal to signals output from the transmitter 11 by use of multipliers 68 and 69, is provided in plural form as designated at numerals 71 and 72 and a multiplexer 73 multiplexes signals output from the respective circuits 70 through 72 and transmits it therefrom.

The receiver 78 shown in FIG. 11 takes a configuration wherein a demultiplexer 79 for separating a receive signal is provided and a circuit 82 for multiplying code series PN1 and PN2 respectively orthogonal to the separated signals in the same manner as the transmitter 67 by multipliers 80 and 81 and demodulating the result of multiplication by the receiver 12 (in which the coupler 20 is externally provided) shown in FIG. 1, is provided in plural form as designated at numerals 83 and 84.

Namely, after the code series respectively orthogonal to the signals (whose each image diagram of frequency spectrum is designated at numeral 74) have been multiplied and directly diffused (an image diagram of a frequency spectrum of each diffused signal is designated at numeral 75), the transmitter 67 transmits a signal (whose image diagram of frequency spectrum is designated at numeral 76) increased in bandwidth at an arbitrary diffusion rate N by code multiplexing. The receiver 78 removes a floor under the use of path-diversity effects such as RAKE, etc. to achieve the validity of the present invention. In the transmitter 67, the signals modulated by the transmitter 11 may be code-multiplexed by frequency hopping as an alternative to the direct diffusion of the modulated signals.

Figure 12:
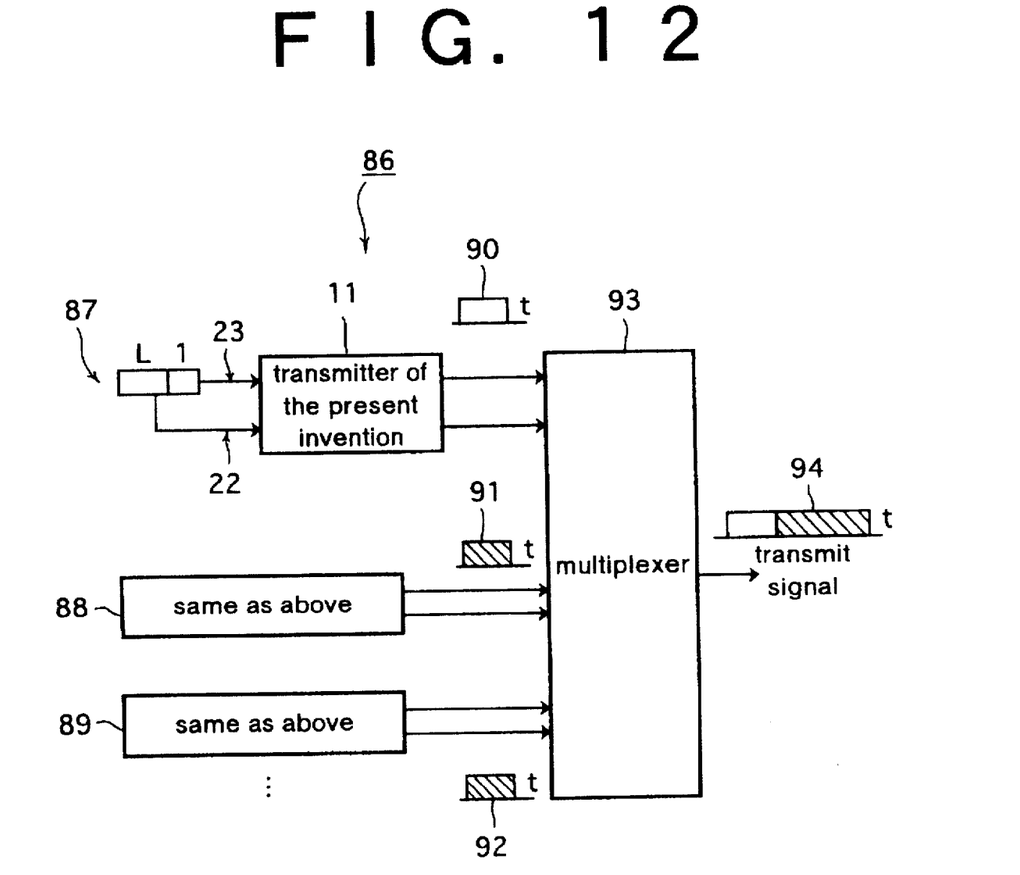
FIG. 12 is a block configurational diagram depicting a transmitter according to a TDMA system of a third embodiment of the present invention.
Figure 13:
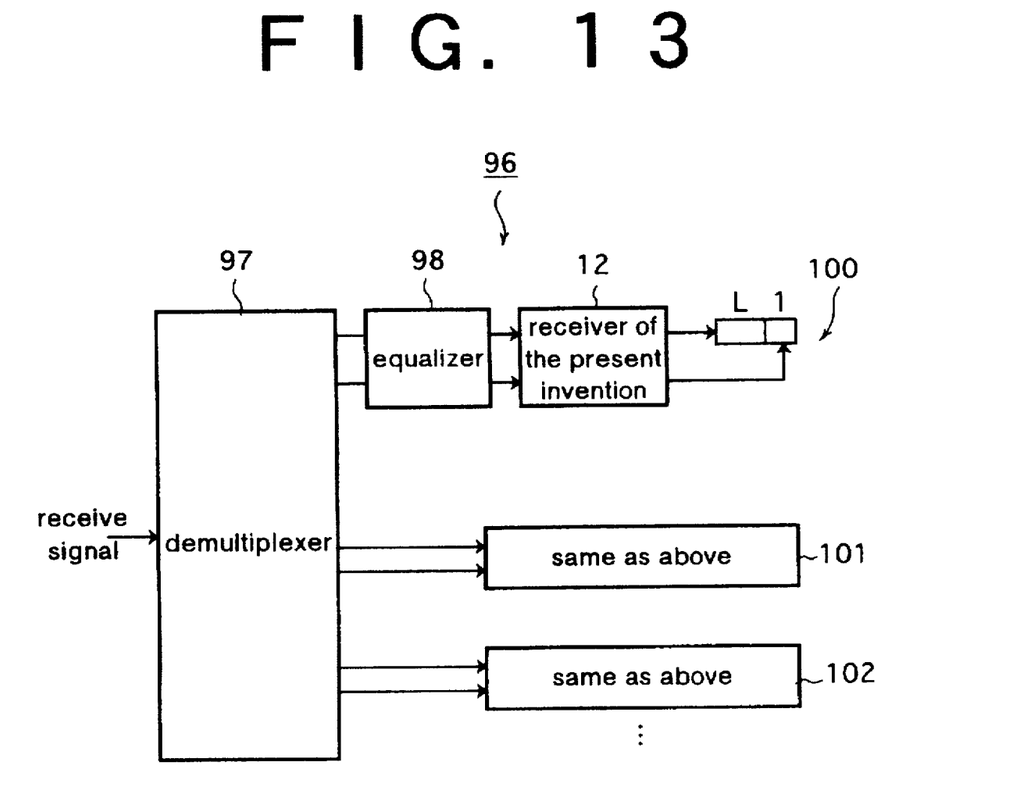
FIG. 13 is a block configurational diagram showing a receiver according to the TDMA system of the third embodiment of the present invention.

FIG. 12 is a block configurational diagram showing a transmitter according to a TDMA system of a third embodiment. FIG. 13 is a block configurational diagram showing a receiver according to the TDMA system. The transmitter 86 shown in FIG. 12 is of a TDMA access system in which each of the transmitters 11 according to the present invention is defined as a modulation scheme. In the TDMA access system, signals output from a plurality of circuits 87, 88 and 89 each having the transmitter 11 shown in FIG. 1 are subjected to time-division multiplexing by a multiplexer 93 every slots of the output signals, which are designated at numerals 90, 91 and 92. The so-multiplexed transmit signal designated at numeral 94 is transmitted from the multiplexer 93.

On the other hand, the receiver 96 shown in FIG. 13 is configured as follows: A circuit 100 for removing a floor with an equalizer (equalizing device) 98 after a received signal has been subjected to time-division by a demultiplexer 97 and demodulating the thus-processed signal with the receiver 12 shown in FIG. 1 after its removal processing, is provided in plural form as designated at numerals 101 and 102, whereby the effectiveness or validity of the present invention is achieved.

Figure 14:
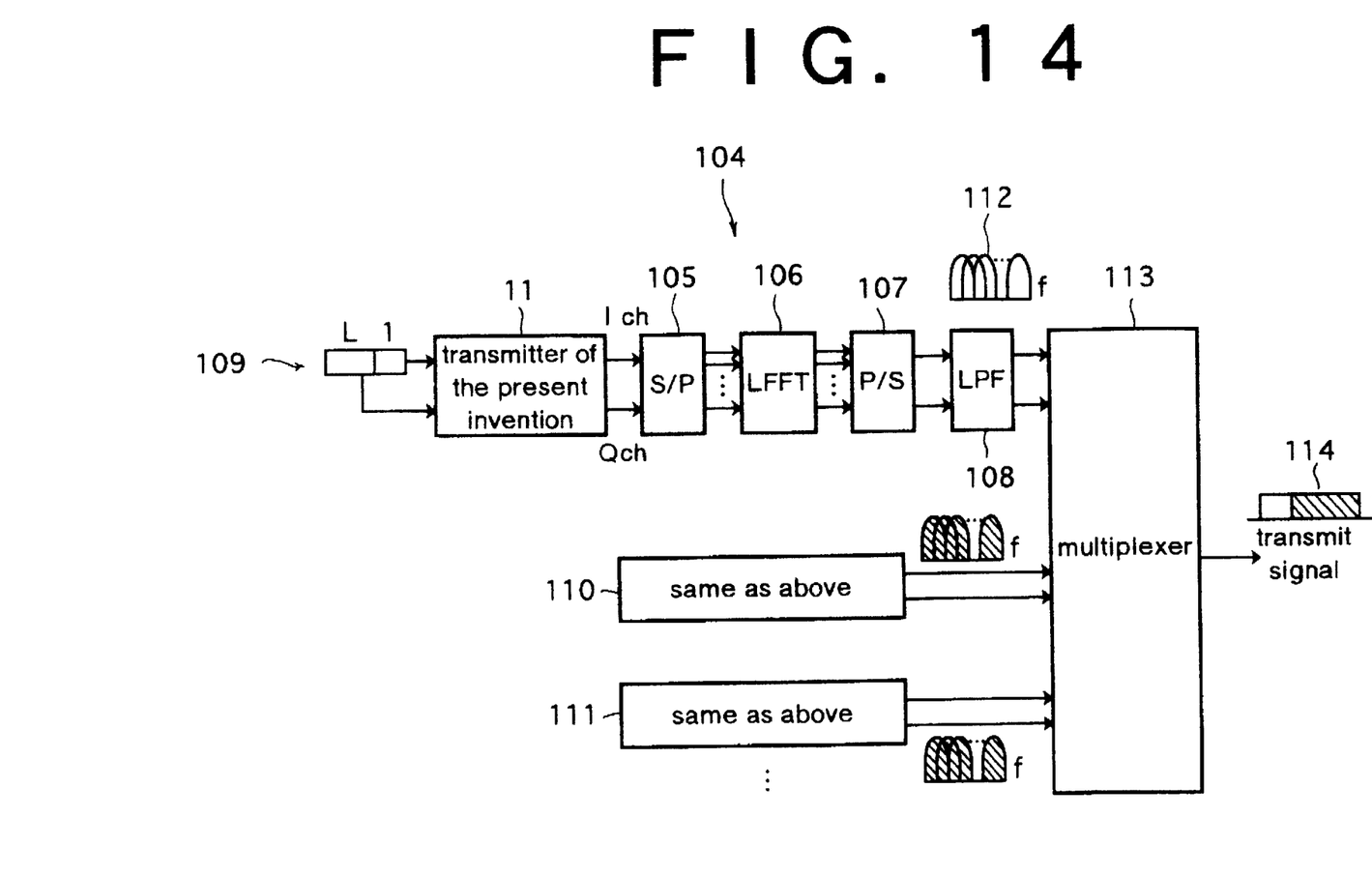
FIG. 14 is a block configurational diagram illustrating a transmitter according to an OFDM-FDMA system of a fourth embodiment of the present invention.
Figure 15:
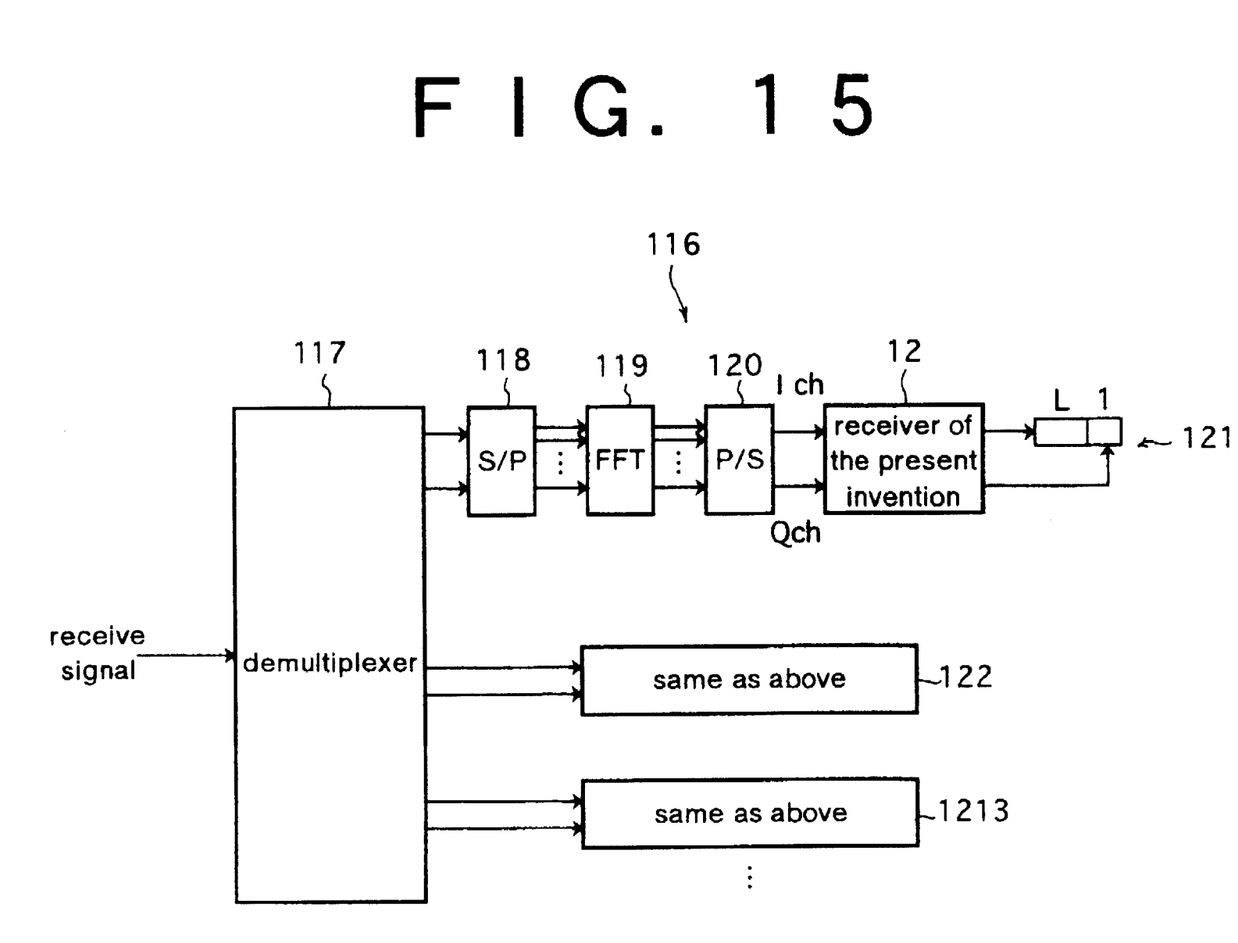
FIG. 15 is a block configurational diagram showing a receiver according to the OFDM-FDFLA system of the fourth embodiment of the present invention.

FIG. 14 is a block configurational diagram showing a transmitter according to an OFDM-FDFLA system of a fourth embodiment. FIG. 15 is a block configurational diagram illustrating a receiver according to the OFDM-FDMA system. The transmitter 104 shown in FIG. 14 is of a multicarrier FDMA access system in which each of the transmitters 11 according to the present invention is defined as a modulation scheme. Particularly, an OFDM system is applied to the transmitter 104. The present transmitter 104 shown in FIG. 14 is configured as follows: A circuit 109 for allowing a P/S converter 35 to convert respective subcarriers (whose image diagram is designated at numeral 112) brought into frequency components by an IFFT circuit 106 into serial data after data mapped by the transmitter 11 according to the present invention have been converted into parallel data by an S/P converter 105 and outputting the converted serial data through an LPF (Low-Pass Filter) 108, is provided in plural form as designated at numerals 110 and 111. Further, signals output from the respective circuits 109 through 111 are multiplexed by a multiplexer 113 from which the resultant signal 114 is transmitted.

The receiver 105 shown in FIG. 15 takes a configuration wherein a demultiplexer 117 for dividing a receive signal is provided and a circuit 121 for converting the divided data into parallel data with an S/P converter 118, followed by cross conversion under Fourier transformation with an FFT circuit 119 and converting the converted data into serial data with a P/S converter 120, followed by inputting to the receiver 12, is provided in plural form as designated at numerals 122 and 123.

Namely, the data mapped by the transmitter 11 according to the present invention are transmitted in the form of the respective subcarriers formed into the frequency components by the IFFT. Since the symbol rate of the subcarrier is low, no equalizer is required in some cases and the validity of the present invention can be achieved even without special compensation for fading. It is however necessary to take countermeasures where the symbol rate of the subcarrier becomes large as the number of carriers decreases. It is obvious that the combination of the respective access systems can be argued in the same manner as described above.

According to the respective embodiments, as has been described above, such advantageous effects as will be described below can be brought about. The effects are obtained where in the system requiring the two different levels of quality (BER) as described above, the modulation scheme is BPSK (QPSK is used for the modulator and demodulator) and the convolutional coding—viterbi decoding is used for the error-correcting mode. Further, over the multipath fading channel and the compensation mentioned above is available, the 2.0 dB gain of subchannel can be given in L=10 (i.e. transparent transmission), while in L=20 in an AWGN channel.

(1) A sub channel having a transmission rate of 1/L is transmitted without an enlargement of a band and an increase in transmission power by mapping binary information subjected to convolutional coding on I and Q axes orthogonal to each other. Thus, the efficiency of utilization of the frequency can be increased from the conventional BPSK modulation+error correcting mode (k/n)bps/Hz to k(1+1/L)/n [bps/Hz] without degrading BER. This means that if the same occupied bandwidth is used, then the transmission rate is increased to (L+1)/L.

(2) By providing two viterbi decoders for I and Q on the receiving side and merging mutual trellises into one every L symbols, the aforementioned sub channel transmission information is decoded simultaneously with the conventional coded information. As a result, the transmission capacity can be increased in a delayless state.

(3) The aforementioned system can provide a channel of quality higher than the conventional channel without addition of a decoding delay by performing the switching between axes based on a symbol larger than the minimum symbol ($L_{min}$) determined based on the quality of a circuit (C/N) required by the system. It is thus possible to provide two channels or circuits which are delayless and different from each other and increase the transmission capacity. It can be said that this would be an effective means for extending an ATM type multimedia radiocommunication system conventionally implemented on a wire onto a radio network.

(4) In a CDFLA access system wherein the aforementioned communication system is defined as the primary modulation, the use of path-diversity effects such as RAKE, etc. and diversity effects under adaptive control of a directional antenna makes it possible to achieve the validity of the present invention under multipath-fading environments and increase the capacity of the system.

(5) In a TDFLA access system using the aforementioned communication system, diversity effects under adaptive control of an equalizer and a directional antenna and their combination make it possible to ensure the validity of the present invention under multipath-fading environments and increase the system s capacity.

(6) It is known that coding (precondition of the present invention) produces a frequency-time diversity effect under an OFDM in a multicarrier FDMA access system using the aforementioned communication system. Thus, the combination of the frequency-time diversity effect and a diversity effect under adaptive control of a directional antenna makes it possible to achieve the effectiveness of the present invention under multipath-fading environments and increase the capacity of the system.

(7) An access system (such as a multicarrier CDMA access system) obtained by combining the two or more access communication systems referred to above allows a further increase in system capacity.

According to an asynchronous transfer mode type multimedia radiocommunication system of the present invention, as has been described above, an advantageous effect can be brought about that when an ATM network is allowed to access radiocommunications, the transmission capacity can be increased without both an enlargement of a band and an increase in power and a delay in transmission, and two channels having different levels of communication quality can be obtained.

What is claimed is:

1. An asynchronous transfer mode type multimedia radiocommunication system including a transmitter and a receiver connected to the transmitter via an asynchronous transfer mode network and wherein accesses to two channel data which are communicated by radio and have different levels of communication quality, are performed by the asynchronous transfer mode network, said transmitter comprising:

a separator for separating input data into L-bit main channel data and one-bit sub channel data;

a convolutional coder for convolutionally coding the main channel data; and a mapper for mapping the convolutionally-coded binary information of the main channel onto crossed I and Q channel axes by switching every L bits of the main channel data in response to the sub channel data, thereby enabling transmission of an additional information corresponding to the sub channel data of 1/L of a transmission rate.

2. An asynchronous transfer mode type multimedia radiocommunication system according to claim 1, wherein said receiver comprises a viterbi decoder for performing switching between the I and Q channel axes for each L symbol of a receive signal and merging mutual trellises on the I and Q channel axes into one, thereby decoding sub channel transmission information corresponding to the addition information simultaneously with coded information obtained by viterbi decoding associated with the convolutional coding.

3. An asynchronous transfer mode type multimedia radiocommunication system according to claim 2, wherein the I and Q channel axes are switched according to a symbol lager than a minimum symbol ($L_{min}$) determined depending on the quality of a circuit required by the system.

4. An asynchronous transfer mode type multimedia radiocommunication system according to claim 2, wherein communications between said transmitter and said receiver are made on a primary modulation basis and applied to a CDMA mode type radiocommunication system.

5. An asynchronous transfer mode type multimedia radiocommunication system according to claim 2, wherein said transmitter and said receiver are applied to a TDMA mode type radiocommunication system.

6. An asynchronous transfer mode type multimedia radiocommunication system according to claim 2, wherein said transmitter and said receiver are applied to a radiocommunication system using a multicarrier mode.

7. An asynchronous transfer mode type multimedia radiocommunication system according to claim 2, wherein said transmitter and said receiver are applied to a radiocommunication system wherein any two or more of the CDMA, TDMA and multicarrier modes are utilized in combination.

* * * * *